US009646343B2

(12) United States Patent
Hinchin et al.

(10) Patent No.: US 9,646,343 B2
(45) Date of Patent: May 9, 2017

(54) SYSTEMS AND METHODS FOR INTERACTIVELY DISAMBIGUATING ENTITIES

(71) Applicant: Thomson Reuters Global Resources, Baar (CH)

(72) Inventors: Patrick Hinchin, Essex (GB); Jochen Lothar Leidner, London (GB); Mans Olof-Ors, Zug (CH); Stuart Whatley, Essex (GB)

(73) Assignee: Thomson Reuters Global Resources, Baar (CH)

( * ) Notice: Subject to any disclaimer, the term of this patent is extended or adjusted under 35 U.S.C. 154(b) by 293 days.

(21) Appl. No.: 14/304,086

(22) Filed: Jun. 13, 2014

(65) Prior Publication Data
US 2015/0363490 A1    Dec. 17, 2015

(51) Int. Cl.
*G06Q 40/02* (2012.01)
*G06Q 10/10* (2012.01)

(52) U.S. Cl.
CPC ............. *G06Q 40/02* (2013.01); *G06Q 10/10* (2013.01)

(58) Field of Classification Search
CPC .................................................. G06F 17/30539
USPC .......... 705/38, 30, 14.41, 306, 34, 348, 400; 707/944, 950, E17.002, E17.014, 707/E17.032, E17.108, 692, 722, 769, 707/783, 784, 805; 709/217, 223, 232, 709/233, 201, 202, 203, 212, 218, 229, 709/231, 242
See application file for complete search history.

(56) References Cited

U.S. PATENT DOCUMENTS 9,245,022 B2 * 1/2016 Bau ................... G06F 17/30864
2004/0236725 A1 * 11/2004 Amitay ............. G06F 17/30672
2006/0213975 A1   9/2006 Krishnan et al.
(Continued)

FOREIGN PATENT DOCUMENTS

WO    2012106008 A1    8/2012
WO    2013101490 A1    7/2013

OTHER PUBLICATIONS

International Search Report and Written Opinion of the International Searching Authority, Aug. 14, 2015.
(Continued)

Primary Examiner — Jay Morrison
Assistant Examiner — Ken Hoang

(57) ABSTRACT

The disclosure relates to entity disambiguation in an interactive fashion based upon attributes. Once disambiguated, a manner in which to review a future article based upon an initial set of attributes and an additional set of attributes and, when needed, generate a warning flag based upon the review is also described. The warning flag may result in a change in the relationship between the entity and an organization such as a bank that is considering engaging in a business relationship with a candidate client, and that may subsequently abandon that plan, or a bank that had previously extended credit to the entity, and that subsequently may be less inclined as a result of the information retrieved by the present invention. A previously accepted entity may also be flagged for credit or anti-money laundering consideration if and when the applicant's situation (e.g., financial situation, involvement in anti-money laundering) changes.

13 Claims, 17 Drawing Sheets

(56) References Cited

U.S. PATENT DOCUMENTS

2007/0233656 A1   10/2007  Bunescu et al.
2010/0287210 A1   11/2010  Olof-Ors et al.

OTHER PUBLICATIONS

PCT International Preliminary Report on Patentability dated Dec. 15, 2016.
PCT International Preliminary Report on Patentability dated Aug. 14, 2015.

* cited by examiner

SYSTEMS AND METHODS FOR INTERACTIVELY DISAMBIGUATING ENTITIES

FIELD OF THE DISCLOSURE

The disclosure relates to systems and methods used in the interactive disambiguation of entities such as people.

BACKGROUND

Due to the global nature of today's economy, a business may interact with potential customers without having enough information regarding them. For example, a person may open a credit card account over the phone or via the internet. As used herein and unless otherwise explicitly noted, the words business, organization, user, and all forms of these words are used interchangeably. An example of an organization is a bank. Also as used herein and unless otherwise explicitly noted, the words customer, person, entity, and all forms of these words are used interchangeably. An example of an entity is a credit card applicant.

Making decisions regarding potential customers without enough information exposes businesses to unnecessary risk. The unnecessary risk may take the form of a policy violation or, in some extreme cases, take illegal forms such as non-compliance with an anti-money laundering statute. Screening solutions enable organizations, mostly financial institutions such as banks and credit card issuers, to minimize the likelihood that a potential customer poses a risk to the organization. For example, banks do not want to issue credit cards to entities deemed not creditworthy. As such, screening solutions help identify whether a potential customer is on a sanctions list, a risk to the organization's regulatory compliance requirements, a risk to the organization's reputation, a risk to commit a financial crime, and/or the like. An example of a screening solution is Thomson Reuters Accelus™ suite of solutions including the World-Check® database. World-Check® risk screening reveals risk hiding in business relationships and human networks. See www.accelus.thomsonreuters.com/solutions/screening/world-check. For example, World-Check® has identified hundreds of entities prior to their appearance on the Office of Foreign Assets Control list. The ability to identify entities on the Office of Foreign Assets Control list is important because "[t]he Office of Foreign Assets Control (OFAC) of the US Department of the Treasury administers and enforces economic and trade sanctions based on US foreign policy and national security goals against targeted foreign countries and regimes, terrorists, international narcotics traffickers, those engaged in activities related to the proliferation of weapons of mass destruction, and other threats to the national security, foreign policy or economy of the United States." http://www.treasury.gov/about/organizational-structure/offices/Pages/Office-of-Foreign-Assets-Contro.aspx.

The use of screening solutions minimizes risk by permitting organizations to search for information regarding potential customers. If the potential customer poses an unacceptable risk based upon use of the screening solution, the organization (e.g., a World-Check® user) may take a number of actions. For example, the organization may: (1) decline to conduct business with the potential customer; (2) may enter into a business relationship with the potential customer only if the potential customer is willing to accept, e.g., a less favorable interest rate, thus compensating the organization for the additional risk; or (3) take some other action based upon the organization's policies.

Screening solutions do, however, come with the challenge of efficiently managing the time required by different people to ensure research excellence. As stated by Thomson Reuters' Accelus™ business with respect to World-Check®:

[i]t is the human element in our systematic approach that is key to the high quality of our intelligence. Raw data is gathered by researchers and automated software and is processed through a series of rigorous guidelines that have been developed as the industry has matured over the last decade. This ensures that the structured intelligence you receive is a product of both advanced technology and a carefully considered process brought about by human interaction. It is this human element that allows us to make further connections between subjects and other business or family relationships, uncover terror networks, and generally increase the relevance of the intelligence offered. Software alone cannot offer this level of research sophistication—people find what machines overlook.

http://accelus.thomsonreuters.com/sites/default/files/L-373292.pdf. Both people on research teams working for information solution providers and users of screening solutions face issues of efficiently managing their time. These issues are described in the subsequent two paragraphs.

First, it takes a great deal of time for a team of researchers to monitor local, national and international media to identify instances of entities involved or connected to illegal and/or undesirable acts. Acts of particular interest may include financial crimes, terroristic acts, and the like. The research team creates a structured data profile for each entity. The team of researchers indexes the structured data profiles. This enables World-Check® users to scan their customer databases for occurrences of these entities and to take appropriate action (e.g., exiting the customer relationship, marking the customer as high risk and subjecting the customer to stringent monitoring, etc. . . . ) for each such occurrence identified. Appropriate actions will be dictated by the individual policies of each World-Check® user. Most, if not all, World-Check® users have policies that require the World-Check® users to react to identification of occurrences by, e.g., exiting the customer relationship or designating the customer as "high risk" and subjecting the customer to stringent monitoring.

Second, due to at least the issues associated with disambiguating potential customers from one another (e.g., "Is this the 'Mark Roberts' for which I am looking?"), it also takes time for organizations (e.g., World-Check® users) to search "adverse" media (e.g., sourced from Thomson Reuters Newsroom data) that indicate that their potential customers may be involved in activities where there is a risk to the organization in doing business with that potential customer. These searches tend to be broader than structured data profile searches and allow organizations to conduct their own research. Organizations are typically faced with many "false positives" when conducting such searches. Organizations spend too much time on false positives.

There is a need for systems and methods that enable more efficient development and use of screening solutions.

SUMMARY

The present disclosure relates to computer implemented systems for and methods of enabling interactive entity disambiguation. More specifically, from a method standpoint, we have invented an automated, computer implemented method of disambiguating a first entity comprising (a) storing a record for the first entity, the record relating to an initial set of attributes; (b) identifying a first list of documents based upon the initial set of attributes, the first list of documents being associated with a set of documents and having a first order; (c) receiving a signal associated with an analysis of a first document from the set of documents; (d) based upon the signal, identifying an additional set of attributes associated with the first entity, the additional set of attributes comprising a set of evidence to contribute to disambiguating the first entity; (e) based upon the initial set of attributes and the additional set of attributes: (e)(1) generating a modified record; and (e)(2) generating a second list of documents associated with the set of documents and having a second order, a first average ranking for a subset of documents associated with the set of evidence being lower than a second average ranking for the subset of documents associated with the set of evidence, the first average ranking being related to the first order and the second average ranking being related to the second order; (f) storing the modified record; and (g) storing the second list of documents.

Advantageously, the systems and methods described herein enable efficient interactive entity disambiguation.

Also advantageously, the systems and methods described herein enable the generation of a warning flag based upon a review of information acquired after an organization (e.g., a bank) has entered into a relationship (e.g., issuance of a credit card) with an entity (e.g., a credit card holder).

Additional advantages and/or features of implementing the present disclosure will be set forth in part in the description. It is to be understood that both the foregoing general description and the following detailed description are exemplary and explanatory.

BRIEF DESCRIPTION OF THE DRAWINGS

In order to facilitate the understanding of the present disclosure, reference is made to the figures below in which like elements are referenced with like numerals and wherein:

FIG. 4a through 4j show a particular instance of a disambiguating as shown in FIG. 3.

DETAILED DESCRIPTION OF THE EXEMPLARY EMBODIMENT

Figure 1:
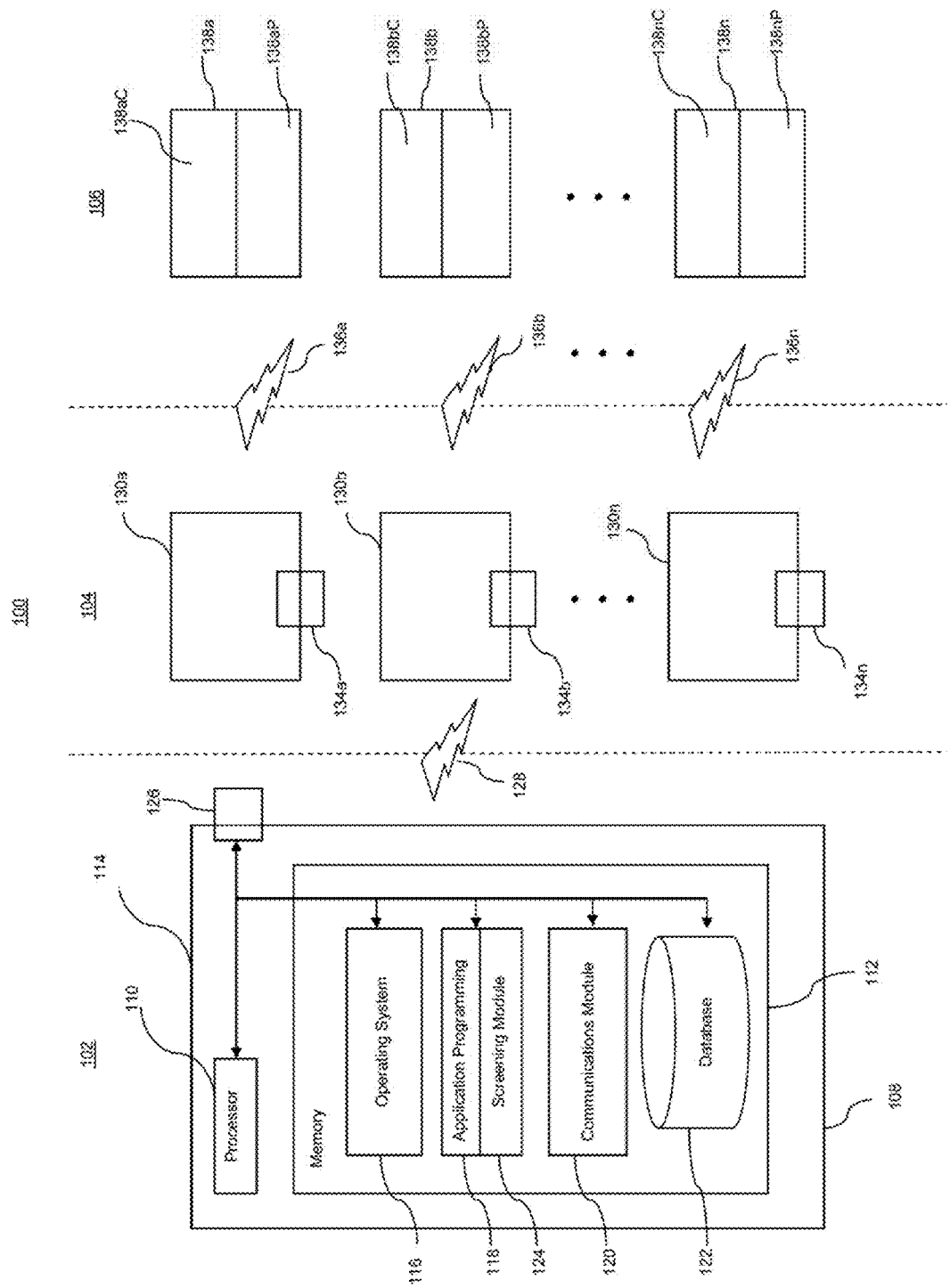
FIG. 1 is a diagram of a system environment in which the exemplary embodiment may be implemented.

FIG. 1 shows a system environment 100 comprising three main components, namely a hosted screening solutions component 102, an organization component 104 and an entity component 106. In the exemplary embodiment the hosted screening solutions component 102, the organization component 104, and the entity component 106 are used by people, respectively, at an information solutions provider such as Thomson Reuters, at a bank such as Bank of America, and a customer, such as a credit card and/or mortgage applicant, seeking to conduct business and/or conducting business with the bank. The system environment 100 will now be described in more detail.

Again referring to FIG. 1, The hosted screening solutions component 102 is operated by an information solutions provider and comprises an infrastructure 108 which includes a processor 110 and a memory 112 interconnected by a communications bus 114. The memory 112 comprises an operating system 116, a set of application programs 118, a communications module 120, and a database 122. The set of application programs 118 comprises a screening module 124. The communications bus 114 is also connected to a communications port 126 through which the infrastructure 108 of the hosted screening solutions component 102 communicates with the organization component 104 via communications link 128. The organization component 104 is comprised of sets of organization infrastructure 130a, 130b, . . . 130n associated with organizations (not shown) 132a, 132b, . . . 132n, respectively. The sets of organization infrastructure 130a, 130b, . . . 130n comprise respective organization structure communications ports 134a, 134b, . . . 134n through which the sets of organization infrastructure 130a, 130b, . . . 130n communicate with both communications link 128 and a respective communications link 136a, 136b, . . . 136n. Communications through communication links 136a, 136b, . . . 136n are communications to and from organizations associated with organization infrastructures 130a, 130b, . . . 130n and sets of entities 138a, 138b, . . . 138n, respectively, associated with the various sets of organization infrastructure 130a, 130b, . . . 130n, respectively. The entity component 106 is comprised of organization infrastructures 138a, 138b, . . . 138n. In addition to being associated with organizations 132a, 132b, . . . 132n, respectively, the various sets of organization infrastructure 130a, 130b, . . . 130n are also associated with organizations 131a, 131b, . . . 131n (not shown but numbered for ease of description), respectively. The set of entities 138a is comprised of two subsets of entities, namely subset 138aC and subset 138aP which represent customers and potential customers, respectively, of organization 131a. Likewise, the set of entities 138b is comprised of two subsets of entities, namely subset 138bC and subset 138bP which represent customers and potential customers, respectively, of organization 131b. Finally, as shown in FIG. 1, the set of entities 138n is comprised of two subsets of entities, namely subset 138nC and subset 138nP which represent customers and potential customers, respectively, of organization 131n.

Again referring to FIG. 1, the following components may be used in implementing the disclosure:

the processor 110 is an Intel processor or a similar processor;

the memories 112 and 114 are manufactured by Siemens or a similar manufacturer;

the communications bus 114 is an Intel communications bus or a similar communications bus;

the operating system 116 is Microsoft Windows 7, Debian Linux or similar operating system; and the database 122 is a Microsoft SQL server, University of California at Berkeley PostgreSQL, or similar database.

The set of application programs 118 comprises code. The code may be written in a single language or multiple languages such as C++, Java, Python, Scala, R or other similar language. As used herein, the set of application programs 118, even though the plural noun "programs" is used, shall mean one or more programs. Also, those skilled in the art realize that the set of application programs 118 may contain various sets of code for accomplishing specific tasks. An example of this is discussed with respect to FIG. 3.

Again referring to FIG. 1, those skilled in the art appreciate that, although not shown, all infrastructure, including organization infrastructure such as 130a and any and all infrastructure associated with all entities in each set of entities such as 138a has processors, memory, a bus connecting them, software, and other various components. If fact, these infrastructures may contain additional applications and/or hardware to permit the various organizations and entities to perform certain tasks. For example, the infrastructures may be laptops, desktops, hand-held devices, and servers and may have the Microsoft Office suite of products loaded thereon. Further, as used herein, each set of entities, namely 138a, 138b, . . . 138n, including respective subsets 138aC, 138aP, 138bC, 138bP, . . . 138nC, and 138nP, may comprise zero or more entities. Thus, a set and/or subset of entities may have only a single entity or may even be the null set.

Yet again referring to FIG. 1, communications links 128, 136a, 136b, . . . and 136n may be any type of know communications links including wireless links, wired links. Further, communications link 128 enables communications between the infrastructure 108 and the sets of organization infrastructure 130a, 130b, . . . 130n. The sets of organization infrastructure 130a, 130b, . . . 130n communicate with the infrastructure of their respective sets of entities 138a, 138b, . . . 138n via communication links 136a, 136b, . . . 136n, respectively. The infrastructure of each of the entities in the set of entities 138a, 138b, . . . 138n may be systems with any combination of hardware and software to enable communications through communication links 136a, 136b, . . . 136n, respectively. Examples of such systems include personal computers, laptops, handheld devices, and the like. Further, an entity in, e.g., set of entities 138aP may communicate with organization 131a without using communications link 136a by simply traveling to organization 131a (e.g., a branch of a bank) to conduct business (e.g., complete a credit card application).

Figure 2:
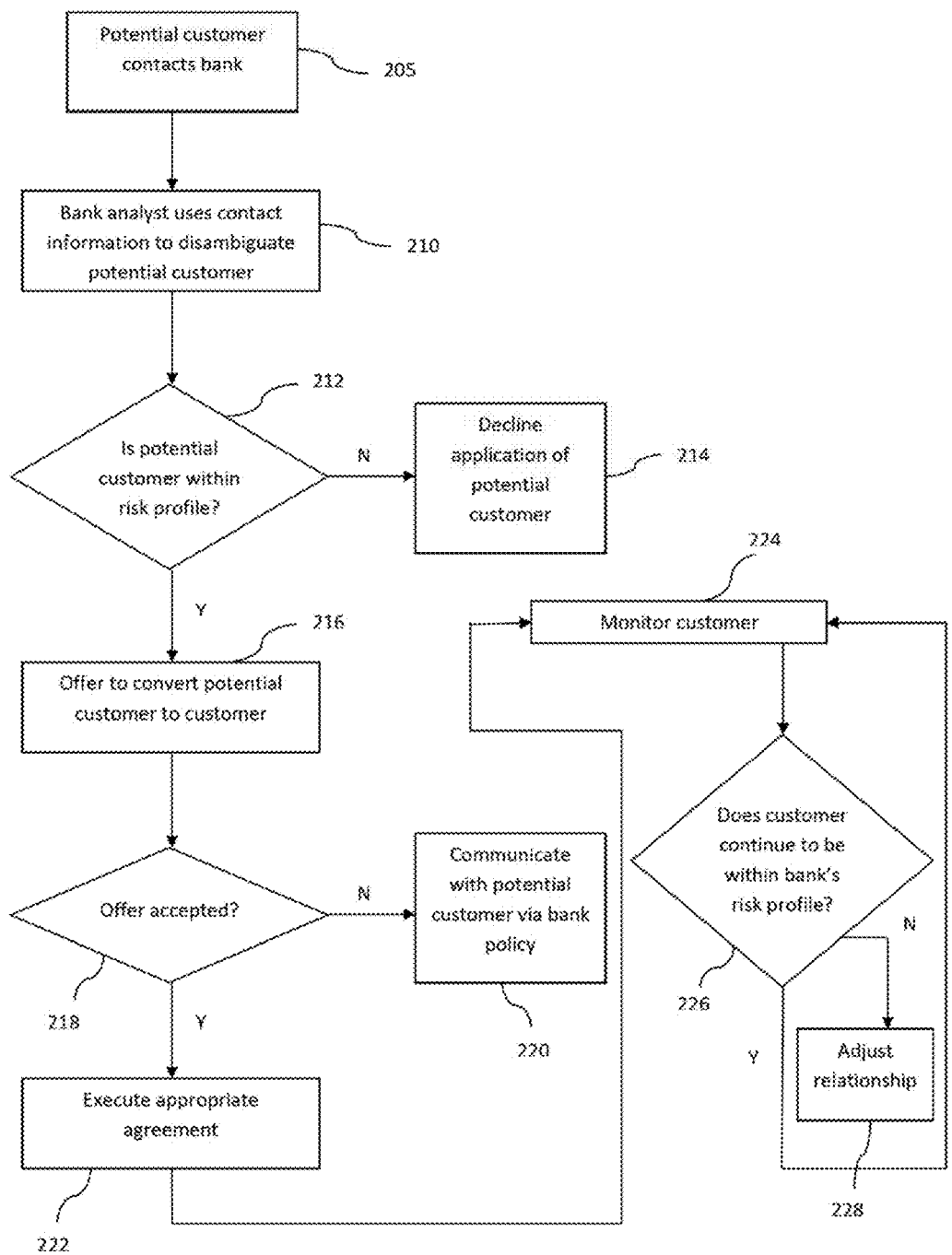
FIG. 2 is a flowchart of a method that may be conducted using the system environment of FIG. 1.

FIG. 2 shows a flowchart 200 detailing the manner in which numerous people interact with system environment 100 in order to determine the relationship, if any, that will exist between a potential customer and a bank after the bank has received screening information regarding the potential customer by using information solutions from the information solutions provider. FIG. 2 also shows how customers are monitored to ensure they continually fit a risk profile which is acceptable according to the policies of the bank.

Again referring to FIG. 2, at step 202 a potential customer 204 from, e.g., the subset of entities 138aP (see FIG. 1) enters information in order to apply for a credit card issued by a bank 206 (not shown) associated with, e.g., organization infrastructure 130a. This is shown in step 205. The information passes through communication link 136a to organization structure communications port 134a where it's processed by organization infrastructure 130a. A worker 208 (not shown), typically a credit officer, at the bank 206 accesses organization infrastructure 130a and analyzes the information to determine the risk posed by offering a credit card to the potential customer 204. In order to do this, the worker 208 must disambiguate the potential customer 204. This is shown in step 210. Details of step 210 are explained with respect to FIG. 3 below. Once the potential customer 204 is disambiguated, the process continues with step 212 wherein the worker determines whether issuing a credit card to the potential customer 204 is within the risk profile of the bank 206. This may be based upon internal bank policies and other factors such as national regulations, international regulations, and anti-money laundering rules, statues, and/or laws. If the worker 208 determines issuing the credit card to the potential customer 204 is not within the risk profile of the bank 206, the worker 208, as shown in step 214, will decline the application. As a matter of courtesy, this may result in a communication, electronic or otherwise, to the potential customer 204. If, however, the worker 208 determines issuing the credit card to the potential customer 204 is within the risk profile of the bank 206, the worker, as shown in step 216, will offer the potential customer 204 the credit card. At this point, as shown in step 218, the potential customer decides whether to accept the offer. If the offer is not accepted, the process ends as shown in step 220. In this case, the bank 206 may have a policy to send a communication to the potential customer thanking them for their interest in the bank 206 and/or urging them to accept the offer. The potential customer 204 may also accept the offer by, e.g., activating the credit card as shown in step 222. At this point, the potential customer 204 becomes a customer 204a (not shown) of the bank 206. In this example, due to the transition from being a potential customer 204 to a customer 204a, the customer 204a is moved from the subset of entities 138aP of the set of entities 138a to the subset of entities 138aC of the set of entities 138a. As shown in step 224, the worker 208, however, is not done as the worker 208 must monitor the customer 204a to ensure they continually fit a risk profile which is acceptable according to the policies of the bank 206. After the monitoring of the customer 204a, as shown in step 224, the worker 208 must ensure that continuing to extend credit to the customer 204a under the current terms of the agreement (see step 222) is within the acceptable risk profile of the bank 206. If it is, the customer 204a will be monitored at a future time (see step 224). If it is not, the bank 206 may adjust the relationship, as shown in step 228, with the customer 204a. The monitoring process is described in more detail with respect to FIG. 4.

Figure 3:
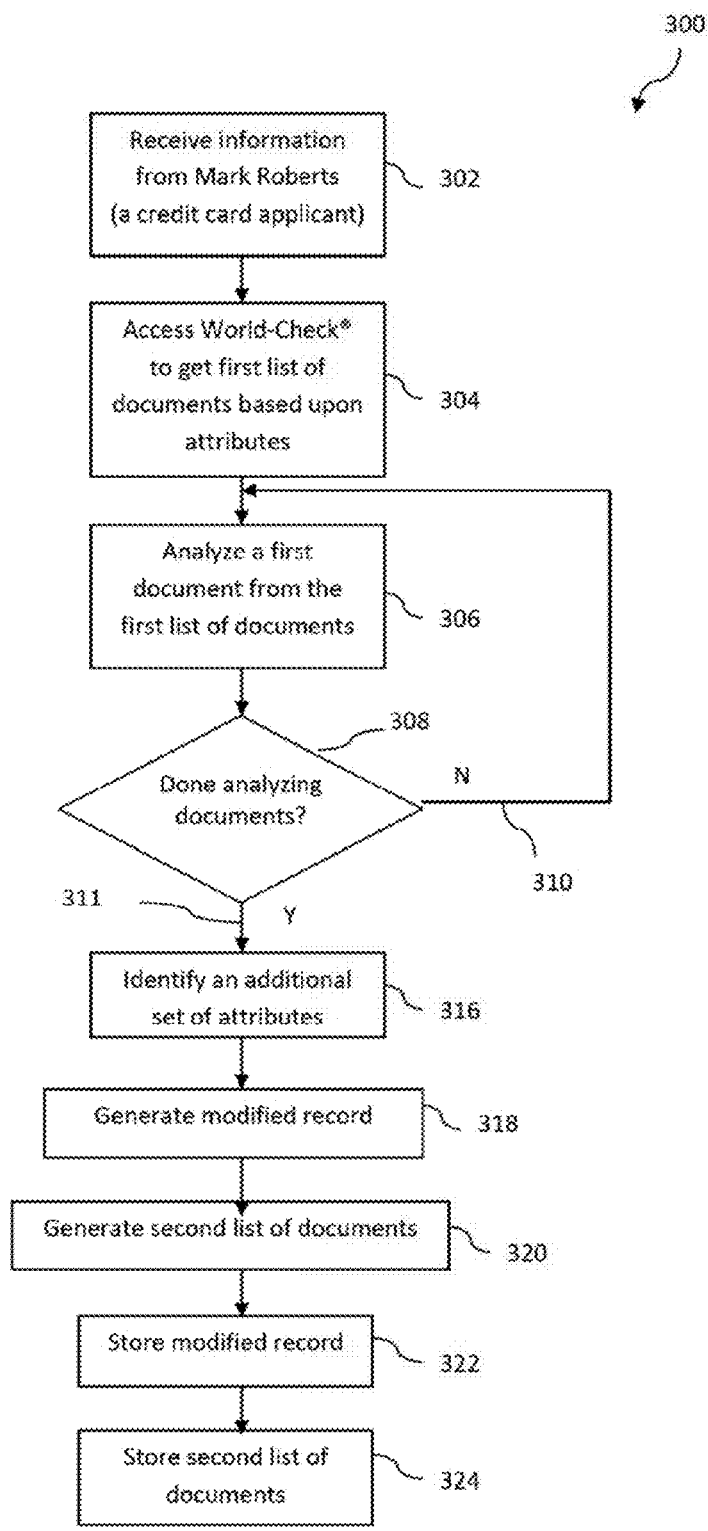
FIG. 3 is a more detailed flowchart of the a portion of FIG. 2.

FIG. 3 is a more detailed flowchart of a portion of FIG. 2. More specifically, the flowchart 300 relates to the disambiguation process for a first entity. To be clear, an entity such as a potential customer 204 may be identified with a unique identifier such as a social security number ("SSN"). However, even a SSN of the potential customer 204 may not enable the bank 206 make a fully informed decision as to whether or not to offer the potential customer 204 a credit card. This is because, e.g., a story mentioning a high-risk person (e.g., a person convicted of a financial crime) would not list the person's social security number. Thus, this is where the need to disambiguate the potential customer 204 is used. Consider a situation wherein a person with a common name, such as Mark Roberts, applies to the bank 206 for a credit card. A search for "Mark Roberts" will likely uncover much information, some of which is related to Mark Roberts the potential customer 204 and some of which is related to other people with the name John Smith. As used herein, reference to MR#1 shall refer to Mark Roberts the potential customer 204a and MR#2 . . . MR#n shall refer to other people named John Smith. The bank 206 may have internal policies or may have to comply with external laws and regulations that forbid the issuance of a bank account or credit card to a person who has:

been convicted of a serious crime (e.g., a felony);
filed for bankruptcy;
been linked to terrorism;
been linked to drug trafficking;
been listed on a particular government list (e.g., the OFAC list);
been accused of any type of financial fraud (regardless of the seriousness of the accusation);

indications of financial distress (e.g., too low a credit score); and/or some other risk impacting information (e.g., their spouse recently filed for a divorce).

It should be noted that filing for divorce or even committing a non-financial crime is typically not a factor in permitting one to open a bank account. Further, even if the policies of the bank 206 do not forbid the issuance of a credit card to certain people, the policies may require different terms (e.g., higher interest rates, etc. . . . ) for people associated with any or all of the above items. Thus, the worker 208 must interact with the organization infrastructure 130*a* of the bank 206 to ensure compliance with the policies. In this regard, the worker 208 invokes the functionality of the hosted screening solutions component 102, including the screening module 124.

Again referring to FIG. 3, efficiently disambiguating an entity (e.g., MR#1) from the entire set of potential entities (e.g., MR#1, . . . MR#n) requires an accurate ranking of information relating the entire set of potential entities. In an interactive fashion, worker 208 uses the functionality of the system environment 100 to disambiguate MR#1 from MR#2, . . . MR#n.

Yet again referring to FIG. 3, the worker 208 uses the organization infrastructure 130*a* to access information relating to "Mark Roberts." This information may include information from a database such as the World-Check® database, information internal to the bank 206 such as a previous credit card application, and other information from other sources such as internet search results. At least part of the accessed information includes a record associated with the MR#1. An example of such information is a record is associated with MR#1's credit card application. This information, supplied by MR#1, is captured and stored in the organization infrastructure 130*a* and communicated to, e.g., the World-Check® database where it is stored as shown in step 302. Thus, at this point, the person (e.g., credit card applicant "Mark Roberts" from subset 138*a*P) has provided the World-Check® database via the user (e.g., worker 208 at organization 132*a* using organization infrastructure 130*a*) with an initial set of attributes.

Yet again referring to FIG. 3 and more particularly to step 304, as this example assumes a hosted screening solution, the hosted screening solutions component 102 identifies a first list of documents and/or information based upon an initial set of attributes associated with MR#1. The first list of documents has a first order. In this example, the World-Check® database has identified a first list of documents based upon six different Mark Roberts based upon the initial set of attributes. The initial set of attributes may include attributes such as first name, last name, middle initial, date of birth, place of birth, social security number, home address, previous home address, and the like. There may also be a "comment" field permitting the entry of comments by bank 206 personnel such as worker 208. The first list, which is stored in memory 112, is accessed by the worker 208 via the organization infrastructure 130*a*, communications link 128, and the hosted screening solutions component 102.

Yet again referring to FIG. 3 and more particularly to step 306, the hosted screening solutions component 102 receives many signals based upon the interaction of the worker 208 with the first document from the first list of documents. The hosted screening solutions component 102 receives a signal based upon the interaction of the worker 208 with the first document. For example, the worker 208 may access a document associated with a BBC story entitled "London air link from Leeds-Bradford is ready for take-off." This story refers to a "Mark Roberts" who is an airport boss and is associated with the reinstatement of services from Leeds-Bradford International Airport ("LBIA") to Heathrow airport. The "YES" and "NO" buttons, respectively labeled 312 and 314, permit the worker 208 to designate the story as being related to the "Mark Roberts" of interest. In this situation, the worker 208 determines that the "Mark Roberts" associated with the reinstatement of services is not the same "Mark Robert" who has applied for a credit card. Thus, the worker 208 designates the attributes LBIA and Heathrow as "negative" attributes. In this sense, the hosted screening solutions component 102 has received a signal (e.g., identification of a negative attribute) associated with an analysis (e.g., the interaction between the worker 208 and the organization infrastructure 130*a*) of a first document (e.g., the BBC story). As is shown in decision box 308 and branches 310 and 311, this process continues with the worker 208 interacting with additional documents and the hosted screening solutions component 102 capturing both the positive and negative attributes identified by the worker 208.

Again referring to FIG. 3, in step 316, the hosted screening solutions component 102 uses the signal relating to all the interactions between the worker 208 and the documents to identify an additional set of attributes. Although this example entails a worker 208 interacting with multiple documents to send a single signal to the hosted screening solutions component 102, those skilled in the art will appreciate the many variations that may occur. For example, the worker 208 may interact with a single document and send a single signal to the hosted screening solutions component 102. Also, the worker 208 may interact with multiple documents and send a single signal to the hosted screening solutions component 102. Further, the worker 208 may interact with multiple documents and send multiple signals to the hosted screening solutions component 102. The additional set of attributes comprises a set of evidence to contribute to disambiguating, e.g., "Mark Roberts."

Again referring to FIG. 3, in step 318, the hosted screening solutions component 102 generates a modified record. This record, for example, will be based upon the initial set of attributes. Thus, it will contain all of the positive attributes supplied by worker 208 for the "Mark Roberts" being sought. It will also, however, be based upon an additional set of attributes. Thus, it will contain new information—namely all of the negative attributes (e.g., LBIA and Heathrow) identified by the worker 208. Those skilled in the art will appreciate that both the initial set of attributes and the additional set of attributes may comprise positive and/or negative attributes.

Having already been used to generate a modified record, both the initial set of attributes and the additional set of attributes are used to generate a second list of documents as shown in step 320. Preferably, the second list of documents comprises documents associated with:

(1) at least one of the positive attributes of the initial set of attributes;

(2) at least one of the positive attributes of the additional set of attributes;

(3) none of the negative attributes of the initial set of attributes; and (4) none of the negative attributes of the additional set of attributes.

The second list of documents has a second order.

Those skilled in the art will appreciate that the worker 208 may have to review numerous documents in order to determine whether doing business with "Mark Roberts" fits the risk profile the user (e.g., bank) is willing to accept. Thus, the fewer documents the worker 208 must review to make this determination, the better. When a worker 208 is provided with a list of documents that should be used to disambiguate an entity (e.g., "Mark Roberts"), the worker 208 is likely to begin reviewing documents at the "top" or beginning of the list. This is why it is important to have documents more likely to enable the worker 208 to make a determination toward the top of the list. This embodiment of the disclosure provides for more pertinent documents being toward the top of the list (wherein "pertinent" means likely to assist in the disambiguation of an entity). Thus, as will be appreciated by those skilled in the art, for a given subset of documents from the set of documents, a first average ranking will be lower than a second average ranking wherein the first average ranking is related to a first order of a first list and the second average ranking is related to a second order of a second list wherein the second list is based upon the initial set of attributes and the additional set of attributes. As used above, a "lower" ranking of a document means the document is less pertinent (i.e., less likely to assist in the disambiguation of an entity than a document ranked higher). Put another way, the worker 208 will be able to make a faster determination as to whether to, e.g., offer a credit card to Mark Roberts by reviewing the second list of documents beginning from the top of the list as opposed to reviewing the first list of documents beginning from the top of the list.

Again referring to step 320 of FIG. 3, the modified record generated in step 318 is used to generate a second list of documents. This second list of documents is not only ordered differently than the first list of documents, it may contain additional documents and may omit certain documents in the first list of documents. In most, if not all, instances, the set defined by the intersection of the sets of documents comprising the first list of documents and the second list of documents will have multiple elements. The common elements are very likely to be in a different order. In addition to comprising common elements with the first list of documents, the second list of documents may also have additional elements not found in the first list of documents. This will occur, for example, when a positive attribute is associated with additional documents not present on the first list.

Again referring to FIG. 3, steps 322 and 324 show the steps of storing the modified record and storing the second list of documents, respectively. At this point, the second list of documents may be transmitted to the worker 208 situated at the organization component 104 via communications module 120 and communications port 126. The worker 208 will analyze as many of the documents from the second list of documents needed to disambibuate "Mark Roberts." Once disambiguated, the worker 208 will apply the organization's policies and/or procedures to determine, e.g., whether to extend a credit card offer to the disambiguated Mark Roberts.

Assuming the organization extends a credit card offer and it is accepted, the organization's work is not done because the disambiguated Mark Roberts who has become a credit card holder of the organization ("MR-CCH") may not always be considered an acceptable credit risk by the organization. Thus, as referred to with respect to FIG. 1, the set of application programs 118 comprises code to assist the organization further. More specifically, the set of application programs 118 a first set of code (not shown) and a second set of code (not shown). The first set of code, when executed by the processor 110, functions to review a future article based upon the initial set of attributes and the additional set of attributes. The second set of code, when executed by the processor 110, functions to generate a warning flag based upon the review. Those skilled in the art will appreciated that the first set of code and the second set of code may interact in any manner. For example, one may dynamically call another. Also, the first set of code and the second set of code may be contained in a single file or multiple files. In the present embodiment, the first set of code is written in Java, the second set of code is written in Java, and they interact with each other using function calls or Web service calls. Essentially, in combination, these sets of code function to alert the organization if and when MR-CCH is no longer in considered an acceptable credit risk.

It will be appreciated by those skilled in the art that the first set of code and the second set of code may be executed periodically (e.g., hourly, daily, weekly, monthly, etc. . . . ). Further, it may be executed with different frequencies for different entities. For example, a bank may want to execute the code more frequently for, e.g., credit card holders it considers to be "higher risk" than for other credit card holders. Also, the first set of code and the second set of code may be executed in order to reconsider a previously rejected entity. For example, suppose a person applies for a credit card and the worker 208 is informed that the person has filed for bankruptcy. Most/all banks would reject this person's application for the credit card. However, after some time, the person may have discharged his/her obligations and no longer be in bankruptcy. They may, in fact, have begun to establish a stellar credit history. In this situation, the first set of code and the second set of code may be used to notify the person that the bank is now willing to extend a credit card offer. There are other situations in which a previously rejected credit applicant may become creditworthy. For example, if a worker 208 learns that an applicant, previously rejected due to being charged with a financial crime and/or felony, has been acquitted, the worker 208 may be able to extend credit to the previously rejected applicant. Thus, the first set of code and second set of code may not only be used to constrict, e.g., a bank's business, they may also be used to identify new opportunities in line with the bank's risk tolerance and policies.

Figure 4A:
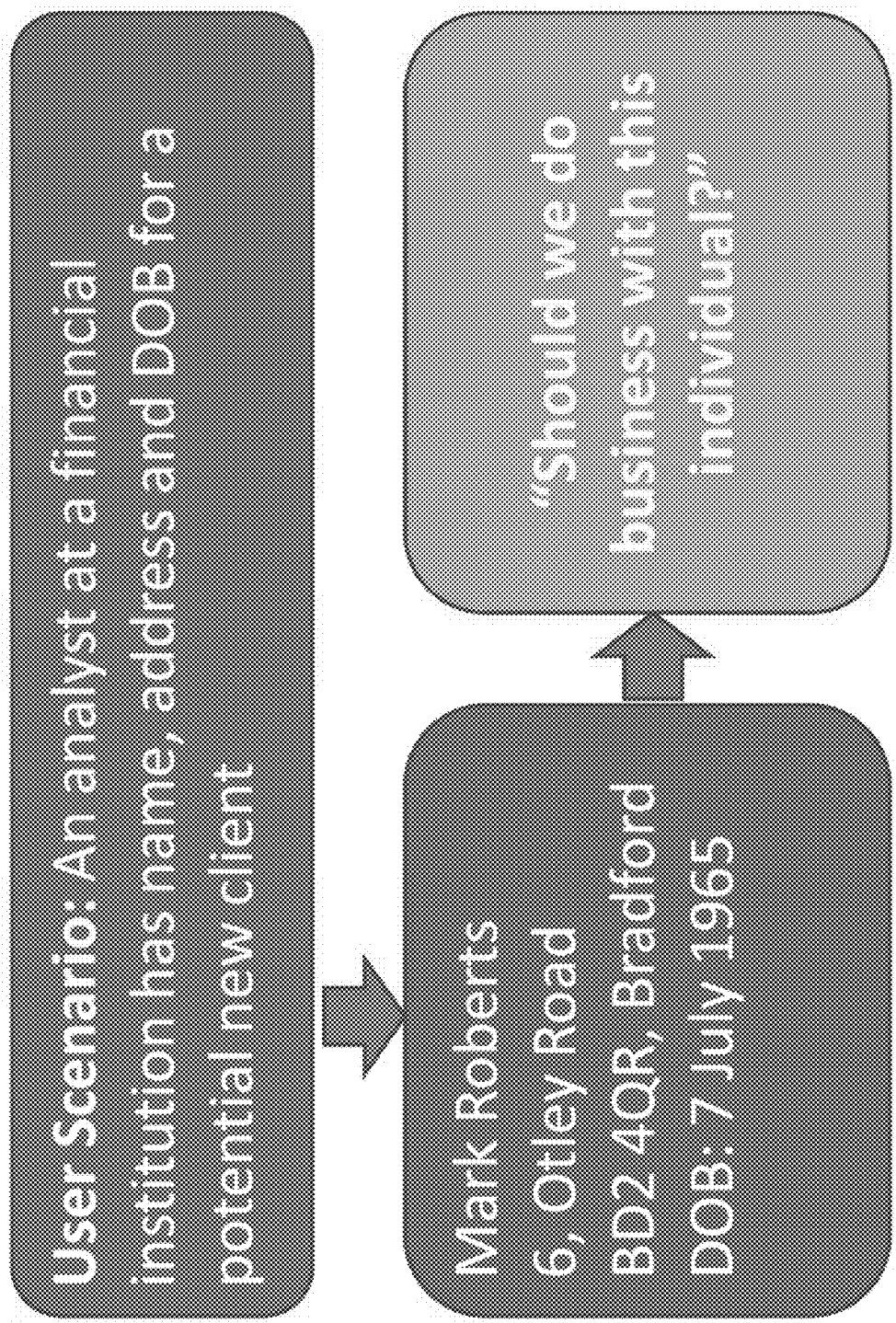
Figure 4B:
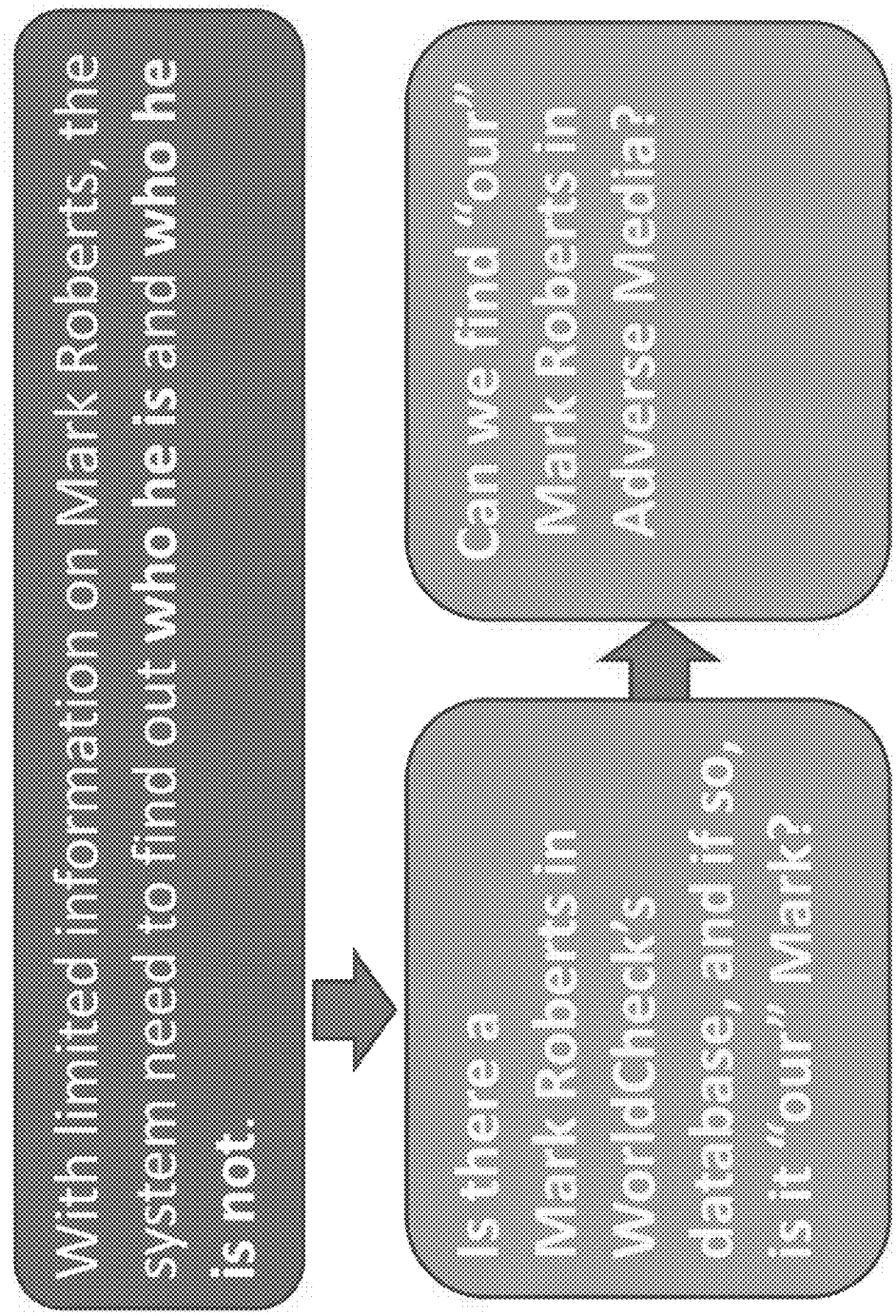
Figure 4C:
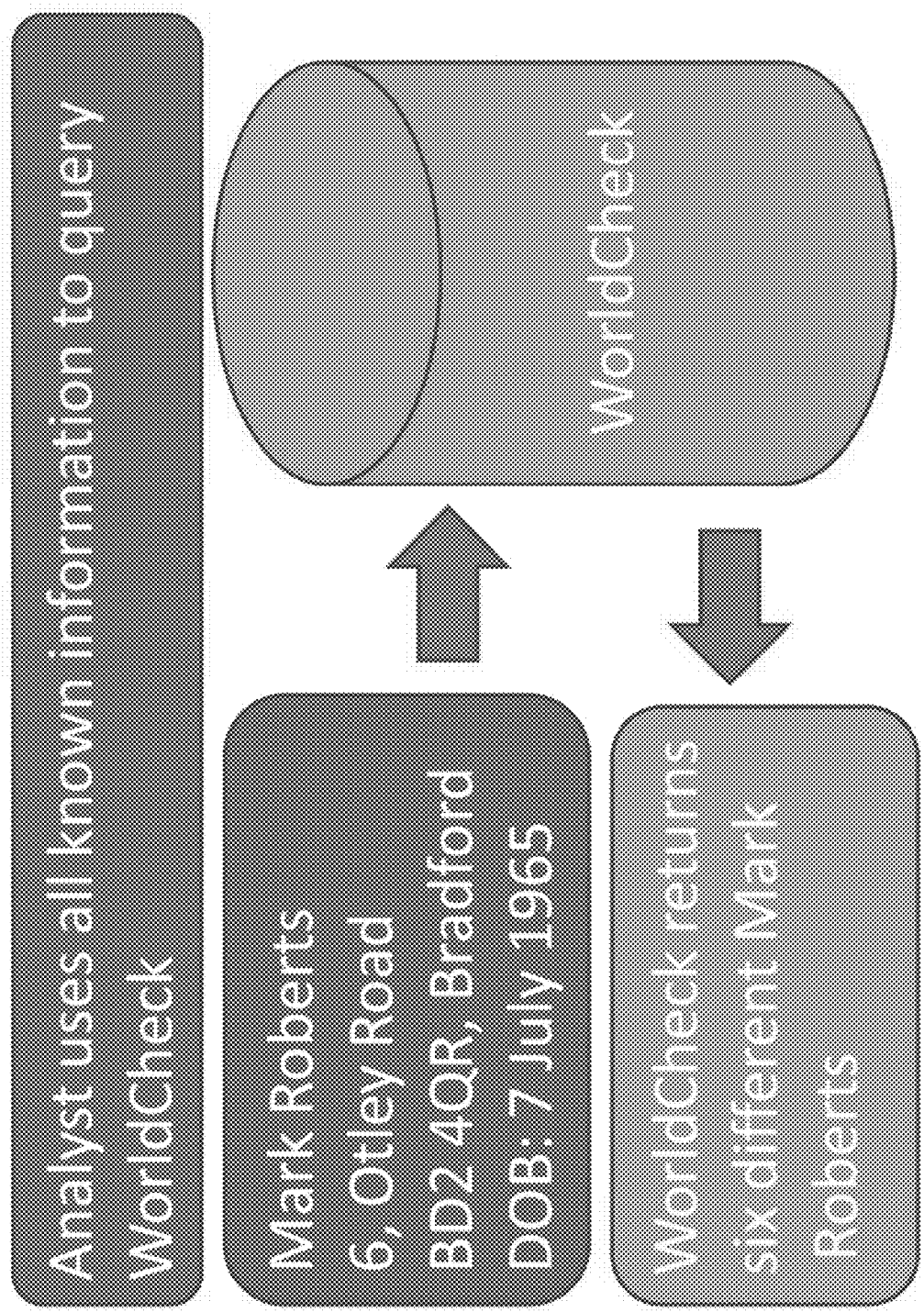
Figure 4D:
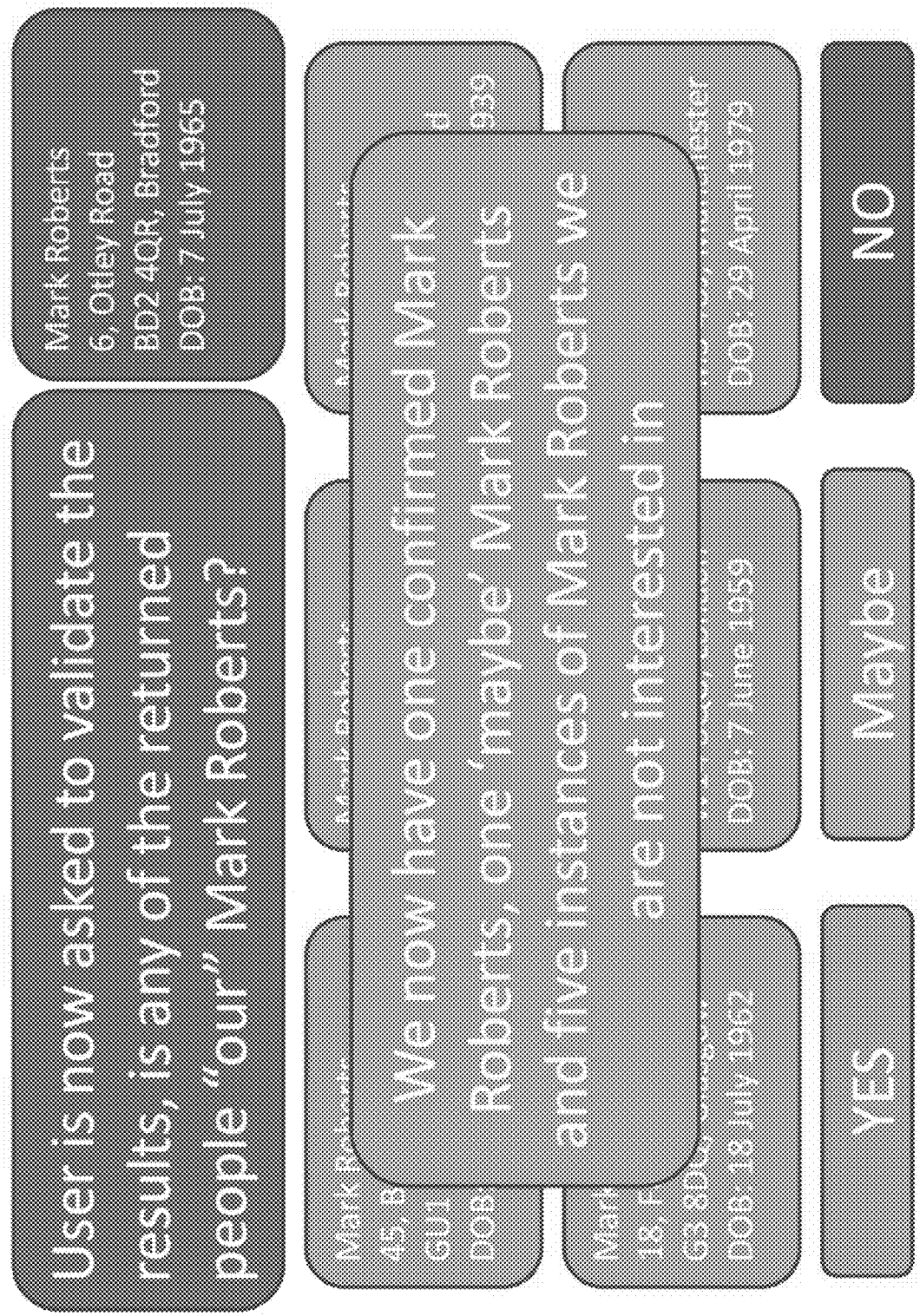
Figure 4E:
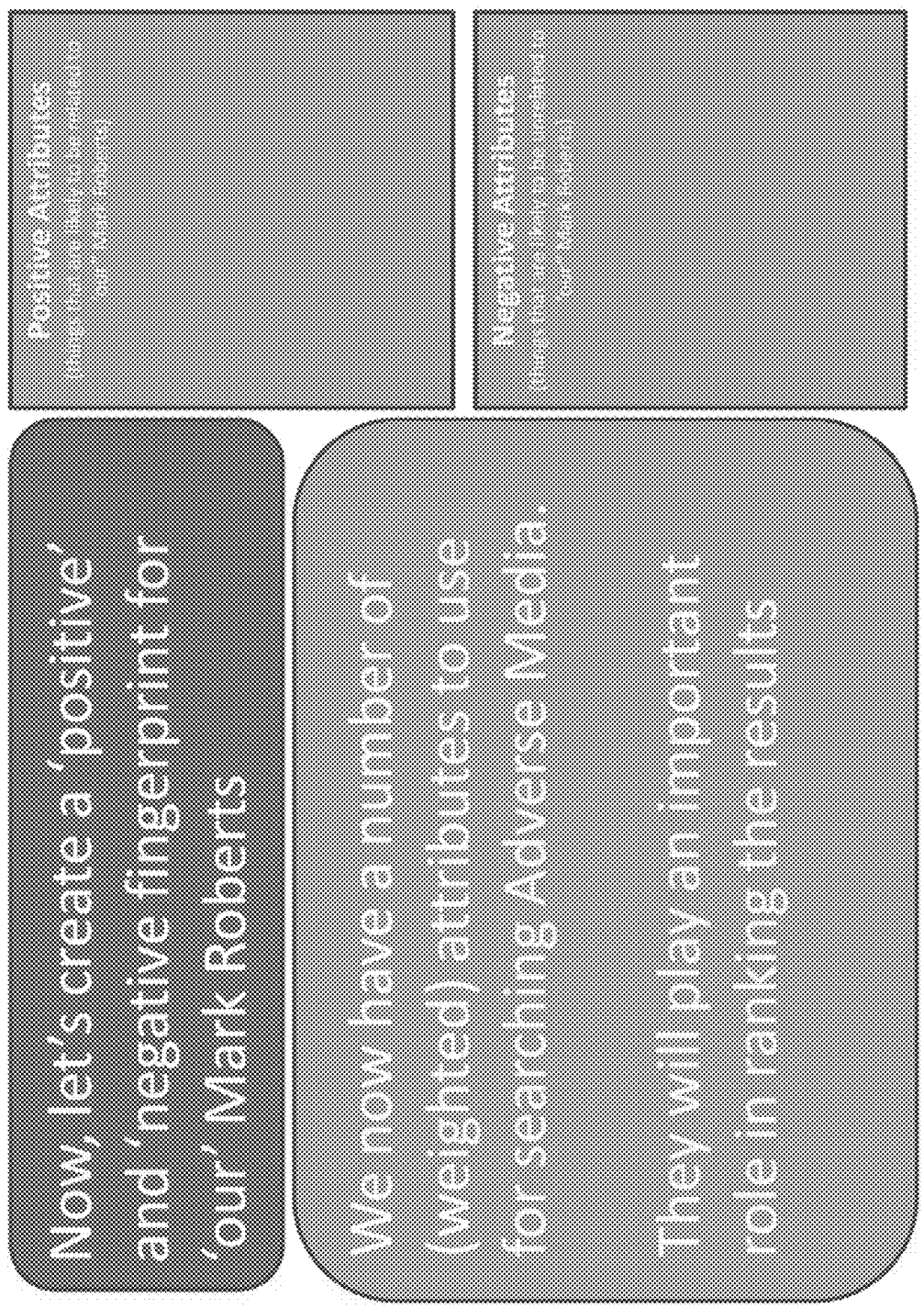
Figure 4F:
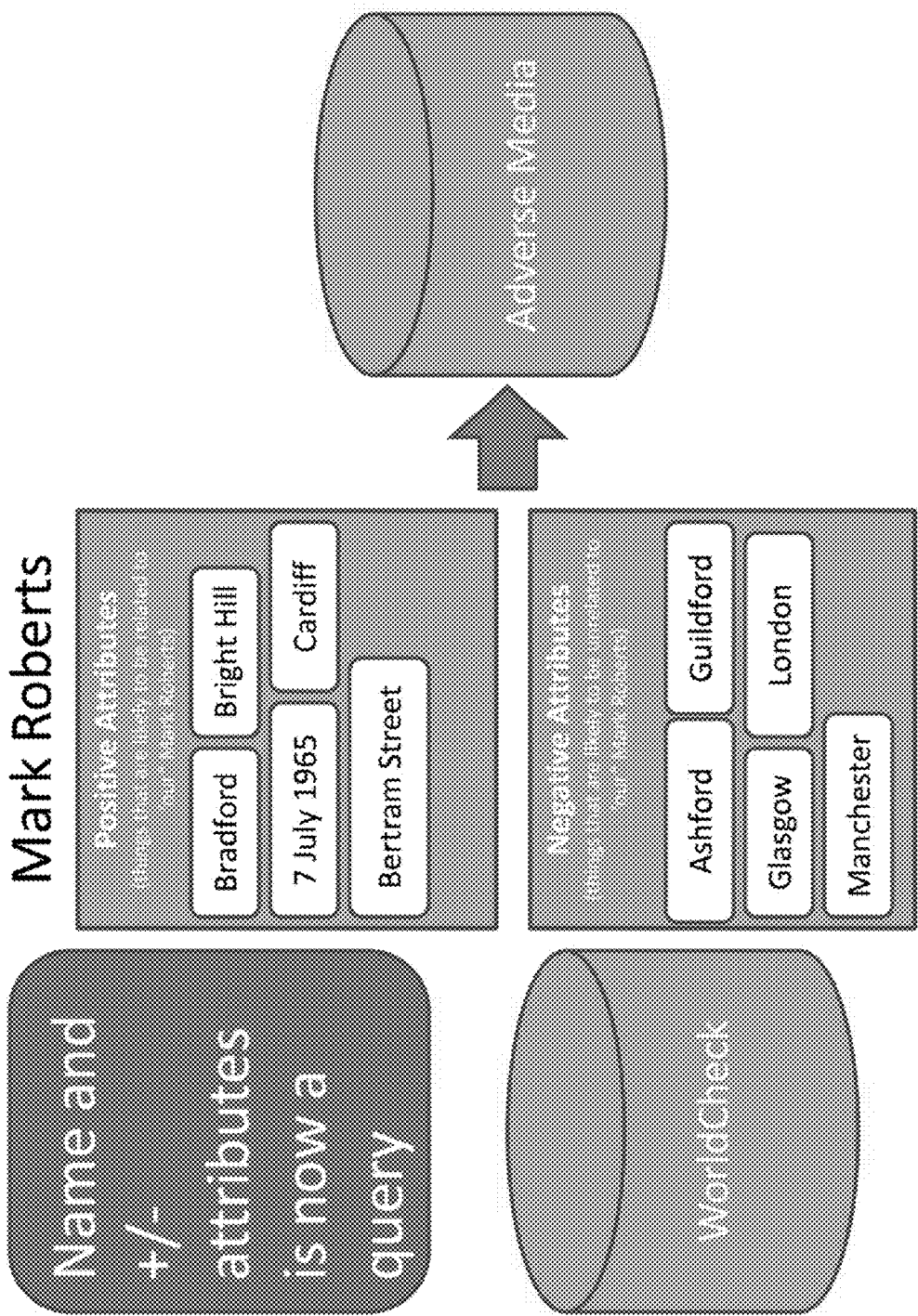
Figure 4G:
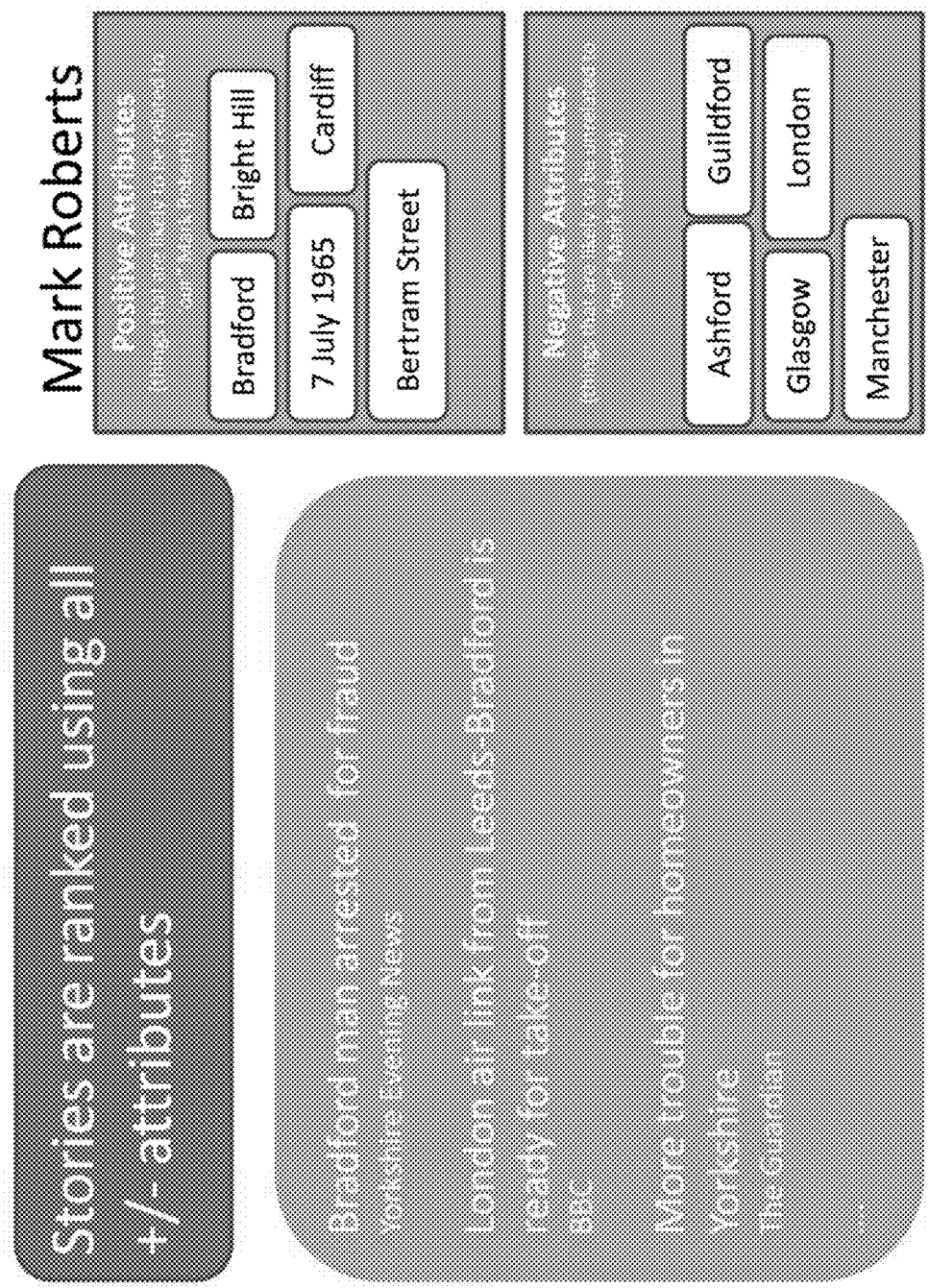
Figure 4H:
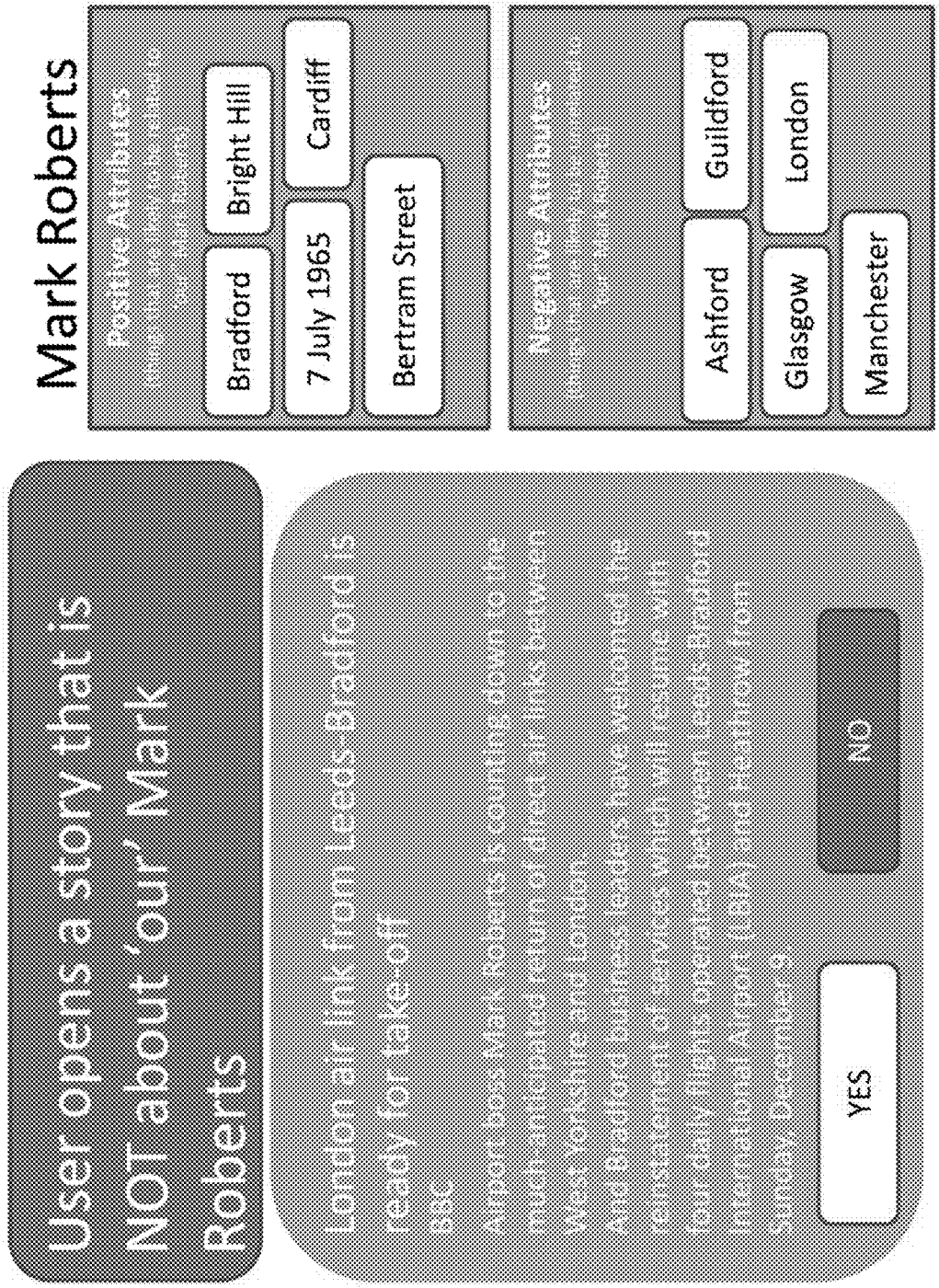
Figure 41:
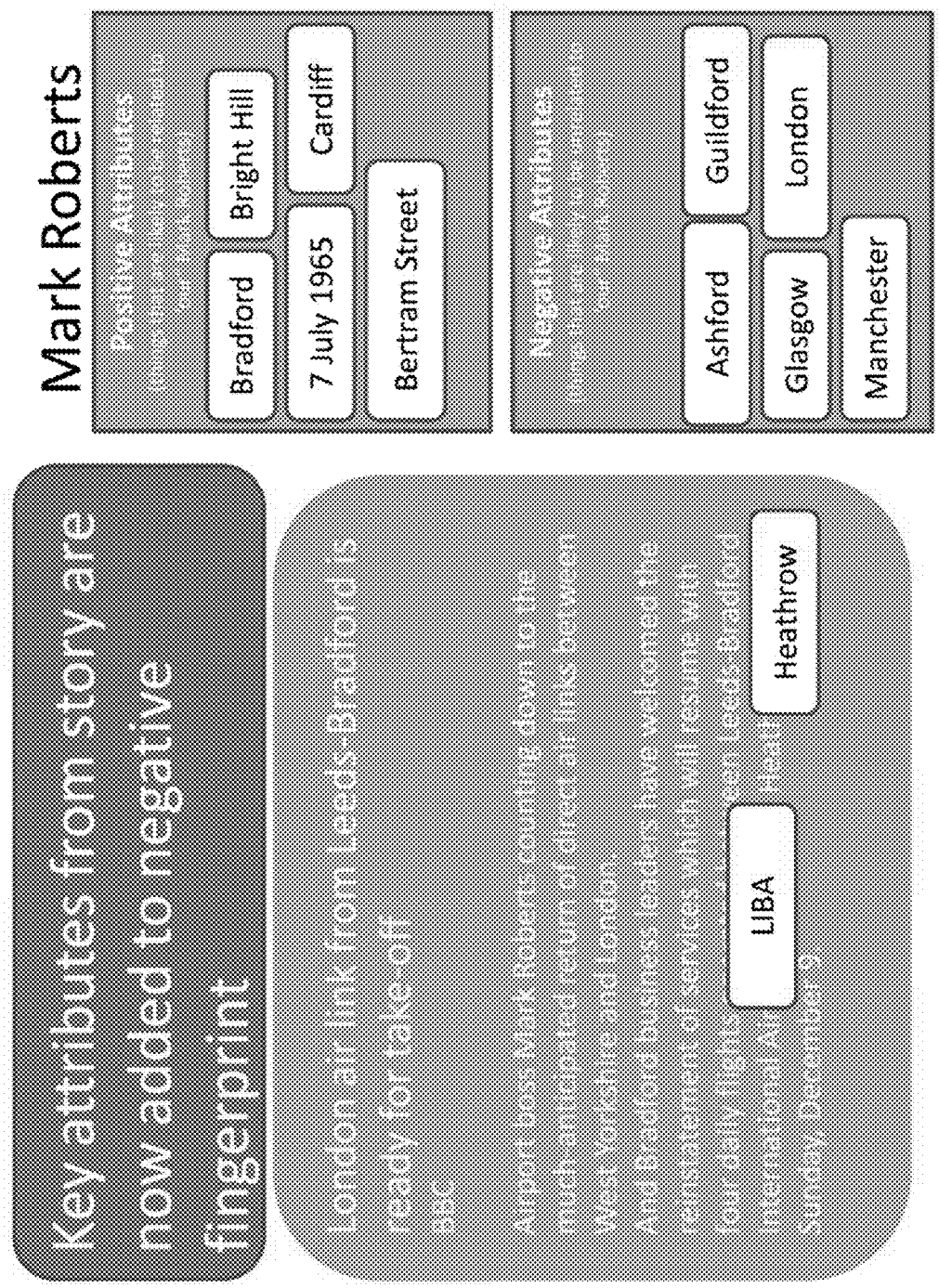
Figure 4J:
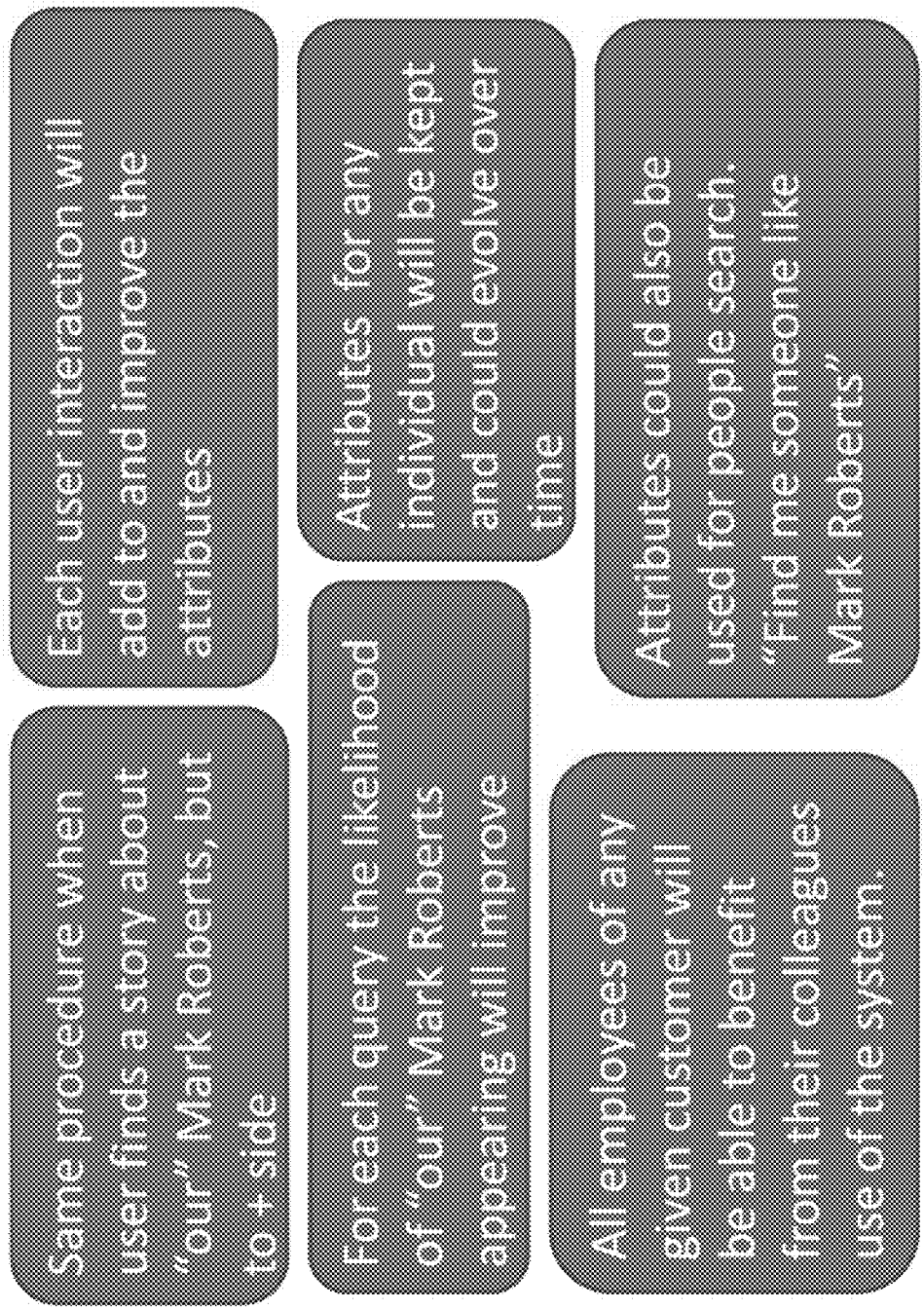

Referring to FIGS. 4*a* through 4*k*, the disclosure will be described pictorially. FIG. 4*a* shows the need for a worker 208 to determine whether the organization for which the worker 208 works should do business with an individual named Mark Roberts. FIG. 4*a* is related to step 302 of FIG. 3. FIG. 4*b*, related to step 304 of FIG. 3, shows that the worker must disambiguate "Mark Roberts" by determine who he is and who he is not. FIG. 4*c*, also related to step 304 of FIG. 3, shows that the worker 208 (referred to as an analyst in FIG. 4*c*) must use information regarding Mark Roberts to query World-Check®. FIG. 4*d*, also related to steps 304 through 308 of FIG. 3, depicts how the worker 208 may come to learn of various instances of "Mark Roberts" (referred to above as MR#1, MR#2, . . . MR#n). FIG. 4*e*, related to step 316 of FIG. 3, depicts the worker 208 interacting with hosted screening solutions component 102 to validate the "Mark Roberts" in which the worker 208 is interested. FIGS. 4*f* and 4*g*, both of which are also related to step 316 of FIG. 3, is depicts the worker 208 creating a "fingerprint" for the "Mark Roberts" in which the worker 208 is interested. The fingerprint may comprise both positive and negative attributes. FIG. 4*h* depicts the worker 208 designating a story as not being about the "Mark Roberts" in which the worker 208 is interested. As shown in FIG. 4*i*, the negative attributes (i.e., LIBA and Heathrow) from FIG. 4*h* are added to the fingerprint. FIG. 4*j* depicts additional features and information of the hosted screening solutions component 102.

Figure 5A:
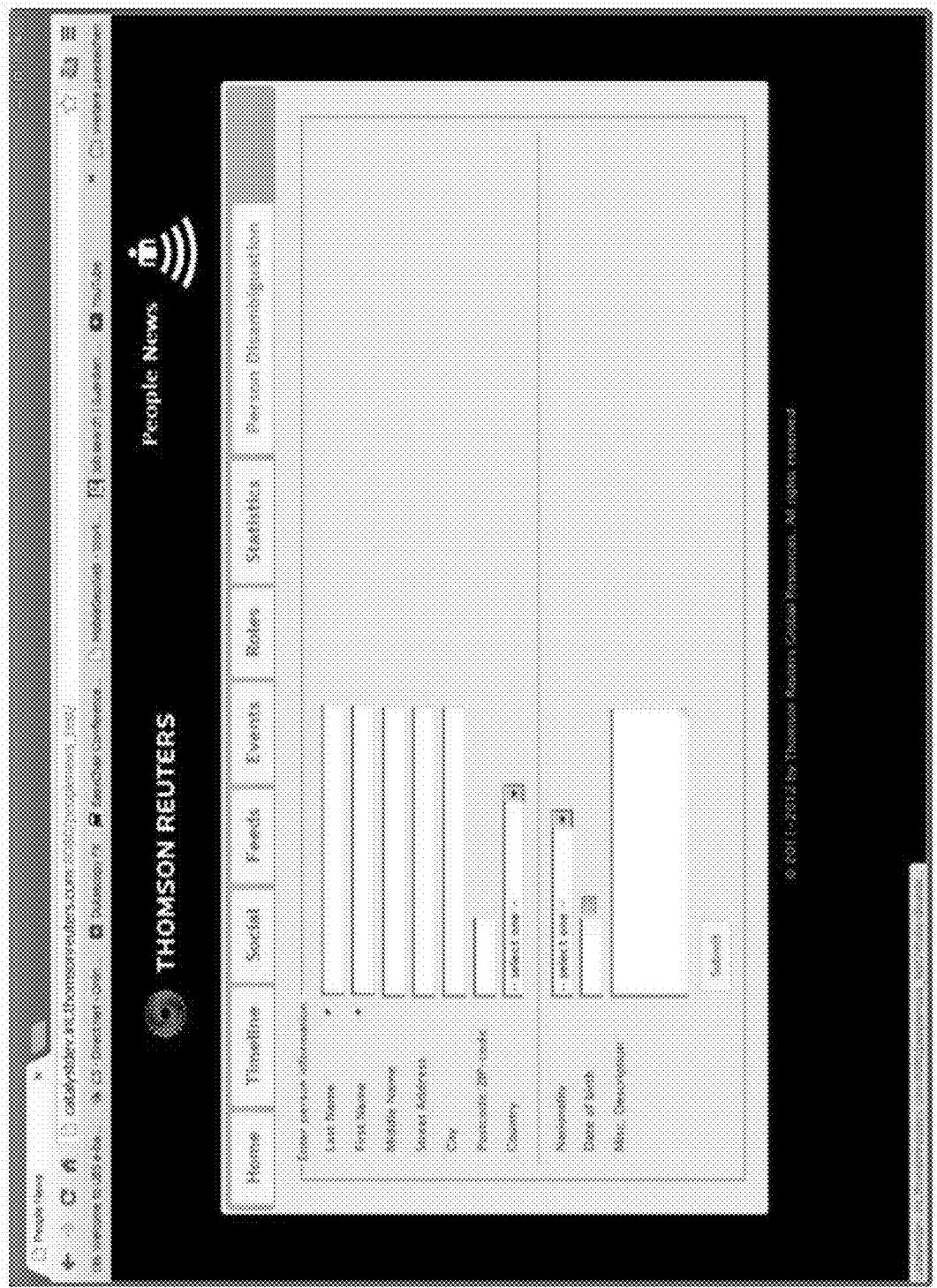
FIGS. 5a through 5d are screenshots of various user interfaces and screenshots associated with the system's operation.
Figure 5B:
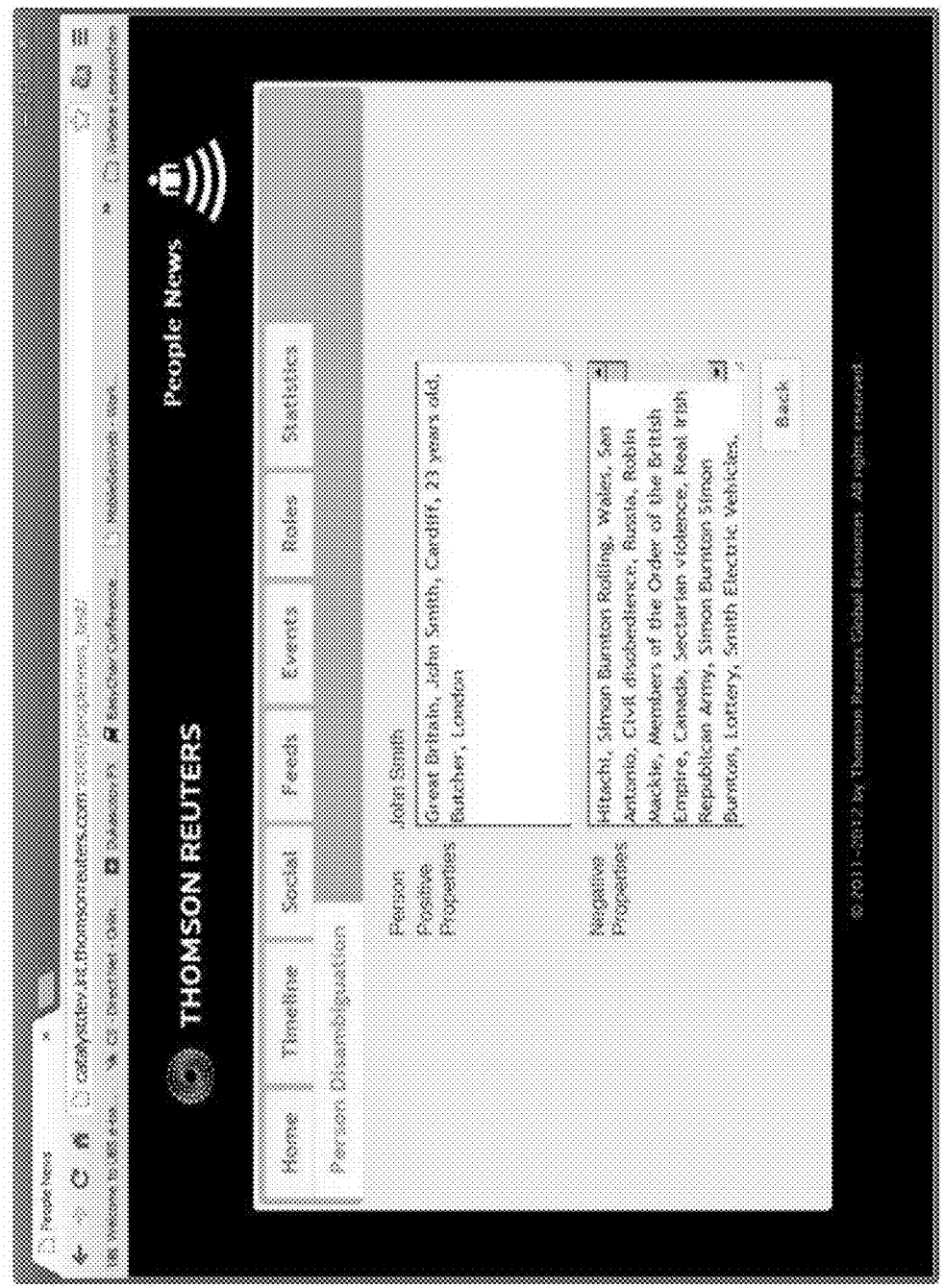
Figure 5C:
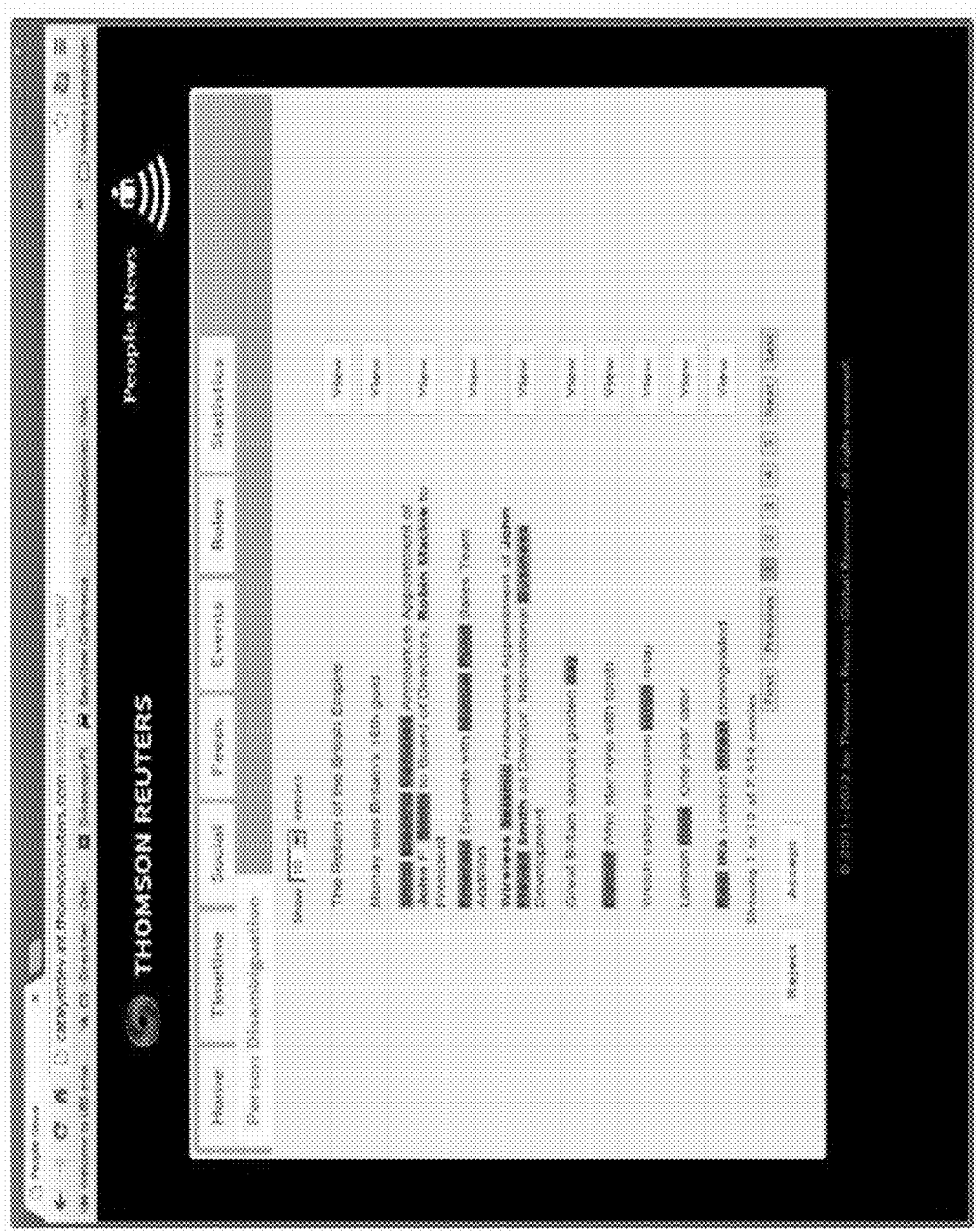
Figure 5D:
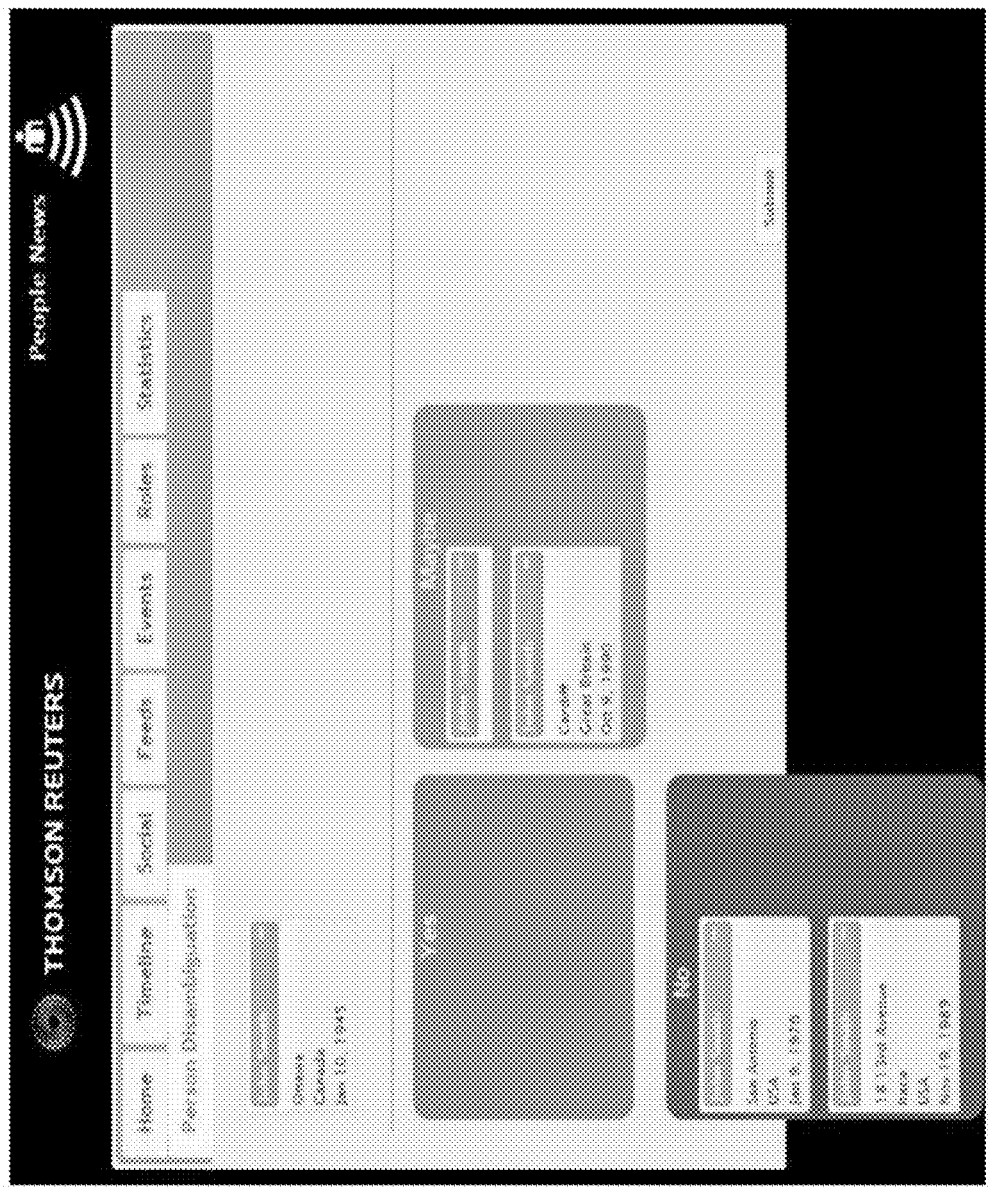

Referring to FIGS. 5*a* through 5*d*, various interfaces and screen shots are shown. FIG. 5*a* shows a user interface for the entry of information by a worker 208. FIG. 5*b* shows at least a partial fingerprint for a "John Smith" about which a worker 208 is seeking information. FIG. 5*c* shows an example list of documents. FIG. 5*d* shows a user interface enabling a worker 208 to designate certain information as being related, being unrelated or maybe being related to, e.g., the person about which the worker 208 must make a determination.

The detailed description has been described by referencing the embodiment described above. Those skilled in the art will realize that there may be many variations to the embodiment described above which is intended only to illustrate and teach one or more ways of practicing or implementing the present disclosure, not to restrict its breadth or scope. For example, the embodiment has been described with respect to a person applying to a bank for a credit card via a computer. However, those skilled in the art will realize that the person could apply in person or via some other communication such as mail. Also, those skilled in the art will appreciate that the person could be applying to be a mortgagee, owner of a bank account, owner of a trading account, holder of an online account for electronic funds transfer, and/or other similar functions. Also, those skilled in the art will further appreciated that the frequency with which a customer, once approved, is monitored may be impacted based upon certain conditions (e.g., the filing of a lawsuit against them). Further, while FIG. 3 has been described as a hosted solution, those skilled in the art will appreciate that each organization may have a local solution. Yet further, the first list and second list may be actual documents/information, may be hyperlinks, or any other item that that puts potentially relevant information in an ordered fashion. Thus, the actual scope of the invention is defined by the appended claims and their equivalents.

What we claim is:

1. An automated, computer implemented method of disambiguating a first entity, the method comprising:
   storing a record for the first entity, the record relating to an initial set of attributes;
   identifying a first list of documents based upon the initial set of attributes, the first list of documents being associated with a set of documents having a first order;
   receiving a signal associated with an analysis of a first document from the set of documents, said analysis comprising determining an initial set of positive and negative attributes;
   based upon the signal, identifying an additional set of attributes associated with the first entity, the additional set of attributes comprising an additional set of positive and negative attributes to contribute to disambiguating the first entity;
   based upon the initial set of attributes and the additional set of attributes:
      generating a modified record comprising in part the initial set of positive and negative attributes and the additional set of positive and negative attributes; and
      generating a second list of documents associated with the set of documents having the first order, based in part on a predetermined intersection of the initial set of positive and negative attributes and the additional set of positive and negative attributes, the second list of documents having a second order, wherein said generating comprises removing a corresponding document from the second list of documents based on negative attributes of the initial set of attributes and the negative attributes of the additional set of attributes, a first average ranking for a subset of documents associated with the set of evidence being lower than a second average ranking for the subset of documents associated with the set of evidence, the first average ranking being related to the first order and the second average ranking being related to the second order;
   storing the modified record; and
   storing the second list of documents.

2. The method of claim 1 wherein the first entity is more easily disambiguated from a second entity using both the initial set of attributes and the additional set of attributes as opposed to using only the initial set of attributes.

3. The method of claim 1 wherein the first entity is selected from the group consisting of a person, a place, a corporation, a company, an organization, a financial instrument name, and a financial instrument code.

4. The method of claim 1 further comprising:
   a. reviewing a future article based on the initial set of attributes and the additional set attributes; and
   b. generating a warning flag based upon the review.

5. The method of claim 4 wherein the warning flag is associated with a potential action selected from the group consisting of cancelling a line of credit of the first entity, modifying a line of credit of the first entity, computing a score reflecting credit-worthiness of the first entity, determining whether to permit the first entity to open a bank account, determining whether it is legal do conduct business with the first entity, terminating a relationship with the first entity, flagging the relationship for human review, determining whether the first entity is sanctioned, determining whether the first entity is in compliance with a policy, recommending further due diligence prior to entering into a relationship with or terminating a relationship with the first entity, and determining whether the first entity is connected to financial crime, bribery and corruption, terrorism, environmental or other crimes.

6. A system for disambiguating a first entity, the system comprising:
   a database for storing a record for the first entity, the record relating to an initial set of attributes;
   a processor for identifying a first list of documents based upon the initial set of attributes wherein the first list of documents is associated with a set of documents having a first order;
   a communications module for receiving a signal associated with an analysis of a first document from the set of documents, said analysis comprising determining an initial set of positive and negative attributes;
   a set of application programs stored in a memory and adapted to be executed by the processor wherein execution of the set of application programs is responsive to the signal and causes the system to:
      identify an additional set of attributes associated with the first entity, the additional set of attributes comprising an additional set of positive and negative attributes to contribute to disambiguating the first entity;
      generate a modified record based upon the initial set of attributes and the additional set of attributes, comprising in part the initial set of positive and negative attributes and the additional set of positive and negative attributes; and generate a second list of documents associated with the set of documents having the first order, based in part on a predetermined intersection of the initial set of positive and negative attributes and the additional set of positive and negative attributes, the second list of documents having a second order, wherein said generate comprises removing a corresponding document from the second list of documents based on negative attributes of the initial set of attributes and the negative attributes of the additional set of attributes, and a first average ranking for a subset of documents associated with the set of evidence is lower than a second average ranking for the subset of documents associated with the set of evidence and the first average ranking is related to the first order and the second average ranking is related to the second order; and a memory for storing the modified record and the second list of documents.

7. The system of claim 6 wherein the first entity is more easily disambiguated from a second entity using both the initial set of attributes and the additional set of attributes as opposed to using only the initial set of attributes.

8. The system of claim 6 wherein the first entity is selected from the group consisting of a person, a place, a corporation, a company, an organization, a financial instrument name, and a financial instrument code.

9. The system of claim 6 wherein the set of application programs further comprises:

a first set of code for reviewing a future article based on the initial set of attributes and the additional set attributes; and a second set of code for generating a warning flag based upon the review.

10. The system of claim 9 wherein the warning flag is associated with a potential action selected from the group consisting of cancelling a line of credit of the first entity, modifying a line of credit of the first entity, computing a score reflecting credit-worthiness of the first entity, determining whether to permit the first entity to open a bank account, determining whether it is legal do conduct business with the first entity, terminating a relationship with the first entity, flagging the relationship for human review, determining whether the first entity is sanctioned, determining whether the first entity is in compliance with a policy, recommending further due diligence prior to entering into a relationship with or terminating a relationship with the first entity, and determining whether the first entity is connected to financial crime, bribery and corruption, terrorism, environmental or other crimes.

11. The system of claim 9 wherein the first set of code and the second set of code are adapted to be executed daily.

12. The method of claim 2 wherein the second entity is selected from the group consisting of a person, a place, a corporation, a company, an organization, a financial instrument name, and a financial instrument code.

13. The system of claim 7 wherein the second entity is selected from the group consisting of a person, a place, a corporation, a company, an organization, a financial instrument name, and a financial instrument code.

* * * * *